United States Patent
Hart et al.

(10) Patent No.: US 11,556,359 B2
(45) Date of Patent: Jan. 17, 2023

(54) SYSTEMS AND METHODS FOR BUILDING DYNAMIC INTERFACES

(71) Applicant: CAPITAL ONE SERVICES, LLC, McLean, VA (US)

(72) Inventors: Colin Hart, Arlington, VA (US); Jason Ji, Reston, VA (US); Alexandra A. Colevas, Arlington, VA (US); Steven Quadros, New York, NY (US); Adnan Malik, Voorhees, NJ (US); Jared M. Alexander, Vienna, VA (US); Scott Golder, Columbia, MD (US); Allison Abbott, Washington, DC (US); Matthew Horton, Arlington, VA (US); Emma Sagan, Washington, DC (US); Kevan Emmott, Arlington, VA (US); Christine Ann Berglund, Brooklyn, NY (US)

(73) Assignee: CAPTIAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/548,992

(22) Filed: Dec. 13, 2021

(65) Prior Publication Data

US 2022/0164201 A1 May 26, 2022

Related U.S. Application Data

(63) Continuation of application No. 17/013,216, filed on Sep. 4, 2020, now Pat. No. 11,204,784, which is a
(Continued)

(51) Int. Cl.
*G06F 3/0482* (2013.01)
*G06F 9/451* (2018.01)
(Continued)

(52) U.S. Cl.
CPC ............ *G06F 9/451* (2018.02); *G06F 3/0482* (2013.01); *G06F 9/4451* (2013.01); *G06V 40/20* (2022.01)

(58) Field of Classification Search
CPC ...... G06F 3/0482; G06F 3/048; G06F 9/4451; G06V 40/20
See application file for complete search history.

(56) References Cited

U.S. PATENT DOCUMENTS

| | | |
|---|---|---|
| 7,966,329 B1 | 6/2011 | Rukonic et al. |
| 10,108,432 B1 | 10/2018 | Subbiah et al. |

(Continued)

OTHER PUBLICATIONS

Quicken Inc., "Quicken Personal Finance, Money Management, Budgeting", www.quicken.com/how-it-works, printed on Apr. 22, 2018.
(Continued)

*Primary Examiner* — Jeanette J Parker
(74) *Attorney, Agent, or Firm* — DLA Piper LLP US

(57) ABSTRACT

First data indicative of a first plurality of transactions by a user may be processed to generate first behavioral information describing the user. The first behavioral information may be displayed by an interactive user interface. A user input made in response to the first behavioral information may be received and analyzed to generate user preference information indicating a relationship between the first user input and the first behavioral information. Second data indicative of a second plurality of transactions by the user may be received and processed with the user preference information to generate second behavioral information describing the user. The second behavioral information may be displayed by the interactive user interface differently from the first behavioral information by the interactive user interface as a result of the processing of the second data and the user preference information together.

17 Claims, 18 Drawing Sheets

Related U.S. Application Data continuation of application No. 16/108,865, filed on Aug. 22, 2018, now Pat. No. 10,768,950.

(51) Int. Cl.
  *G06F 9/445* (2018.01)
  *G06V 40/20* (2022.01)

(56) References Cited

U.S. PATENT DOCUMENTS

| | | | |
|---|---|---|---|
| 10,223,754 B1 | 3/2019 | Lopez et al. | |
| 10,504,385 B1 | 12/2019 | Harris et al. | |
| 2010/0153242 A1 | 6/2010 | Preston et al. | |
| 2011/0087985 A1 | 4/2011 | Buchanan et al. | |
| 2013/0282542 A1 | 10/2013 | White | |
| 2013/0325680 A1 | 12/2013 | Satyavolu et al. | |
| 2014/0081817 A1 | 3/2014 | Secrist et al. | |
| 2014/0236789 A1* | 8/2014 | Caldwell | G06Q 40/02 705/35 |
| 2014/0244498 A1* | 8/2014 | Shishkov | G06Q 20/3223 705/42 |
| 2014/0365354 A1* | 12/2014 | Shvarts | G06Q 40/02 705/38 |
| 2015/0088704 A1 | 3/2015 | Votaw et al. | |
| 2015/0324930 A1 | 11/2015 | Abernethy | |
| 2018/0097764 A1* | 4/2018 | Lutsenko | H04L 51/224 |
| 2019/0318031 A1 | 10/2019 | Sim et al. | |
| 2019/0342252 A1* | 11/2019 | Dascola | H04M 1/72484 |
| 2021/0318799 A1* | 10/2021 | Oh | G06F 3/0485 |

OTHER PUBLICATIONS

Intuit, Inc., "Mint: Money Manager, Bills, Credit Score & Budgeting", www.mint.com, printed on Apr. 19, 2018.
Intuit, Inc., "Mint Bill Pay: Bill Reminders, Bill Tracking, Online Bill Payment", www.mint.com/how-mint-works/bills#toc, printed on Apr. 19, 2018.
Intuit, Inc., "Mint: Simple Categorization", www.mint.com/how-mint-works/categorization#toc, printed on Apr. 19, 2018.
Intuit, Inc., "Mint: Money Manager, Personal Finance and Budgeting", www.mint.com/how-mint-works, printed on Apr. 19, 2018.
Wikipedia, "Google Now", https://en.wikipedia.org/Google_Now, printed on Aug. 22, 2018.

* cited by examiner

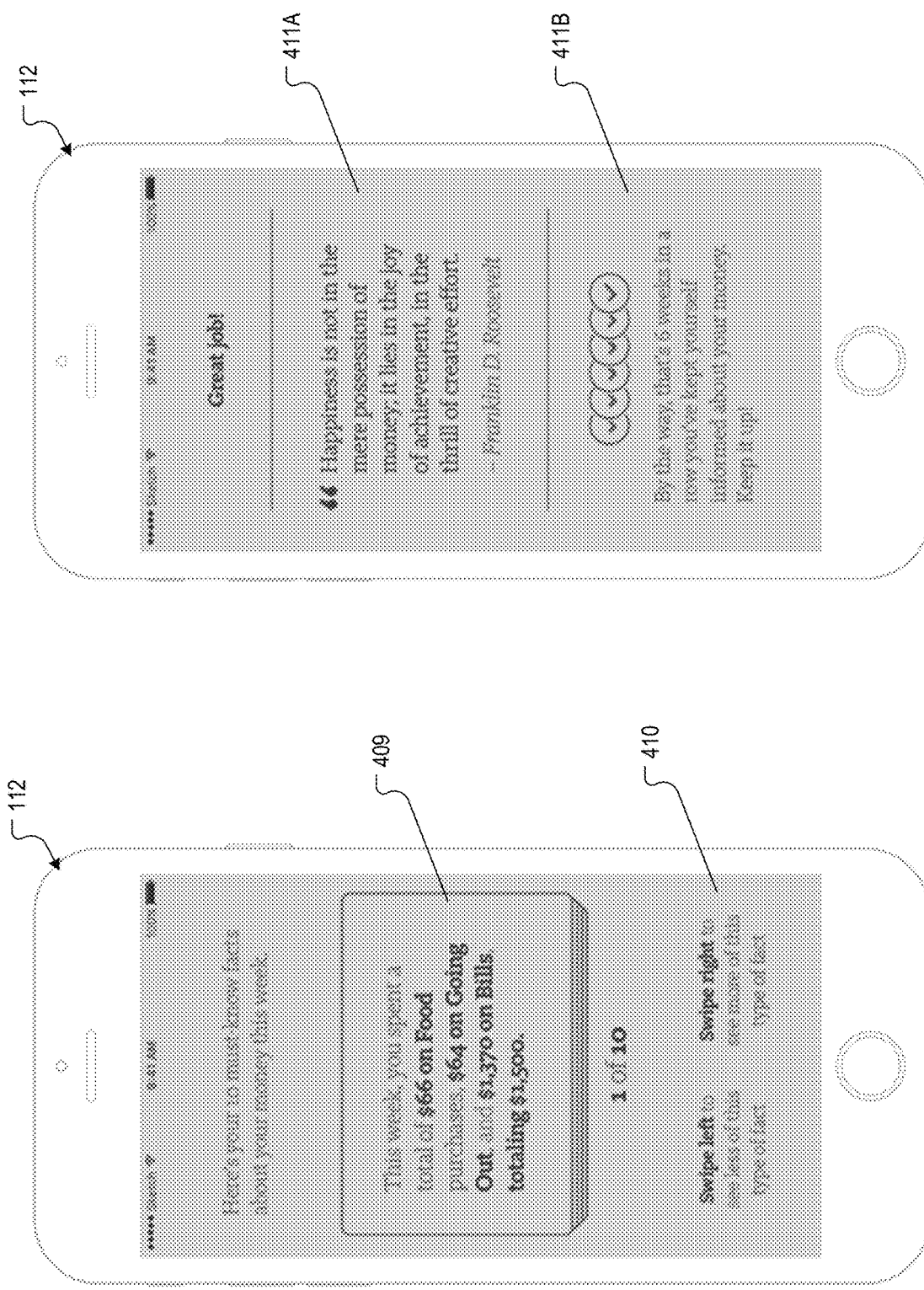

SYSTEMS AND METHODS FOR BUILDING DYNAMIC INTERFACES

CROSS-REFERENCE TO RELATED APPLICATION INFORMATION

This application is a continuation of U.S. patent application Ser. No. 17/013,216, filed Sep. 4, 2020, which is a continuation of U.S. patent application Ser. No. 16/108,865, filed Aug. 22, 2018, now U.S. Pat. No. 10,768,950, issued Sep. 8, 2020, the entirety of which are incorporated herein by reference.

BACKGROUND

Applications and/or websites, such as those configured for use with mobile devices, include user interfaces that may present a variety of information that is dynamic in nature. For example, financial institutions and/or providers may distribute information about a user's financial accounts through mobile apps and/or mobile websites, and in other examples, other dynamic data may be distributed through mobile-friendly user interfaces. Generally, these mobile apps and/or mobile websites are constrained by the screen size and configuration of mobile devices, which may be small and vertically-oriented. Accordingly, customizing the user interfaces may be difficult, especially for the end user.

SUMMARY OF THE DISCLOSURE

In one example, a method of generating a user interface may include receiving, at a processor, first data indicative of a first plurality of transactions by a user and processing, by the processor, the first data to generate first behavioral information describing the user. The method may include causing, by the processor, the first behavioral information to be displayed by an interactive user interface. The method may include receiving, at the processor, a user input made in response to the first behavioral information being displayed through the interactive user interface and analyzing, by the processor, the user input to generate user preference information indicating a relationship between the first user input and the first behavioral information. The method may include receiving, at the processor, second data indicative of a second plurality of transactions by the user and processing, by the processor, the second data and the user preference information to generate second behavioral information describing the user. The method may include causing, by the processor, the second behavioral information to be displayed by the interactive user interface. The second behavioral information may be displayed differently from the first behavioral information by the interactive user interface as a result of the processing of the second data and the user preference information together.

In some embodiments, at least one of processing the first data and processing the second data may include identifying a plurality of peer users having at least one characteristic in common with the user, receiving peer data indicative of a plurality of transactions by the peer users, and generating peer behavioral information describing the peer users. The method may further include causing, by the processor, the peer behavioral information to be displayed by the interactive user interface. In some embodiments, the method may further include preventing, by the processor, information identifying the peer users from being included in the peer behavioral information displayed by the interactive user interface.

In some embodiments, at least one of processing the first data and processing the second data may include using at least one script to generate at least one card. The interactive user interface may include the at least one card. In some embodiments, the method may further include generating, by the processor, the at least one script.

In some embodiments, analyzing the user input may include identifying a portion of the first behavioral information that is of interest to the user as at least a portion of the user preference information. Processing the second data and the user preference information may include selecting a portion of the second data similar to the portion of the first behavioral information that is of interest to the user as at least a portion of the second behavioral information.

In some embodiments, analyzing the user input may include identifying a portion of the first behavioral information that is of no interest to the user as at least a portion of the user preference information. Processing the second data and the user preference information may include excluding a portion of the second data similar to the portion of the first behavioral information that is of no interest to the user from the second behavioral information.

In some embodiments, the method may further include causing, by the processor, an option to adjust a user account setting based on at least one of the first behavioral information and the second behavioral information to be displayed by the interactive user interface. The method may further include receiving, at the processor, a user command in response to the option. The method may further include adjusting, by the processor, the user account setting based on the user command.

In another example, a financial account server device may include a processor and a non-transitory memory in communication with the processor. The memory may store instructions that, when executed by the processor, cause the processor to perform processing. The processing may include processing a first plurality of transactions by a user. The processing may include analyzing the first plurality of transactions to generate first behavioral information describing the user. The processing may include sending the first behavioral information to a user device for display by an interactive user interface of the user device. The processing may include receiving, from the user device, a user input made in response to the first behavioral information being displayed through the interactive user interface. The processing may include analyzing the user input to generate user preference information indicating a relationship between the first user input and the first behavioral information. The processing may include processing a second plurality of transactions by the user. The processing may include analyzing the second plurality of transactions and the user preference information to generate second behavioral information describing the user. The processing may include sending the second behavioral information to the user device for display by the interactive user interface. The second behavioral information may be displayed differently from the first behavioral information by the interactive user interface as a result of the analyzing of the second plurality of transactions and the user preference information together.

In some embodiments, at least one of analyzing the first plurality of transactions and analyzing the second plurality of transactions may include identifying a plurality of peer users having at least one characteristic in common with the user, receiving peer data indicative of a plurality of transactions by the peer users, and generating peer behavioral information describing the peer users. The instructions may further cause the processor to perform processing including sending the peer behavioral information to the user device to be displayed by the interactive user interface. In some embodiments, the instructions may further cause the processor to perform processing including preventing information identifying the peer users from being included in the peer behavioral information displayed by the interactive user interface.

In some embodiments, at least one of analyzing the first plurality of transactions and analyzing the second plurality of transactions may include using at least one script to generate at least one card for display by the interactive user interface. In some embodiments, the instructions may further cause the processor to perform processing including generating the at least one script.

In some embodiments, analyzing the user input may include identifying a portion of the first behavioral information that is of interest to the user as at least a portion of the user preference information. Analyzing the second plurality of transactions and the user preference information may include selecting a portion of the second data similar to the portion of the first behavioral information that is of interest to the user as at least a portion of the second behavioral information.

In some embodiments, analyzing the user input may include identifying a portion of the first behavioral information that is of no interest to the user as at least a portion of the user preference information. Analyzing the second plurality of transactions and the user preference information may include excluding a portion of the second data similar to the portion of the first behavioral information that is of no interest to the user from the second behavioral information.

In some embodiments, the instructions may further cause the processor to perform processing including sending data to the user device causing an option to adjust a user account setting based on at least one of the first behavioral information and the second behavioral information to be displayed by the interactive user interface, receiving a user command from the user device in response to the option, and adjusting the user account setting based on the user command.

In another example, a user device may include a display, an input device, a processor in communication with the display and the input device, and a non-transitory memory in communication with the processor. The memory may store instructions that, when executed by the processor, cause the processor to perform processing. The processing may include sending data requesting a first plurality of transactions by a user to a financial account server device. The processing may include receiving first behavioral information based on the first plurality of transactions from the financial account server device. The processing may include displaying an interactive user interface including the first behavioral information on the display. The processing may include receiving a user input made in response to the first behavioral information being displayed on the display through the input device. The processing may include sending data describing the user input to the financial account server device. The processing may include sending data requesting a second plurality of transactions by the user to the financial account server device. The processing may include receiving second behavioral information based on the first plurality of transactions and the data describing the user input from the financial account server device. The processing may include displaying the interactive user interface including the second behavioral information on the display. The second behavioral information may be displayed differently from the first behavioral information by the interactive user interface as a result of analyzing of the second plurality of transactions and the user preference information together by the financial account server device.

In some embodiments, the user input may identify a portion of the first behavioral information that is of interest to the user as at least a portion of the user preference information. The second behavioral information that is displayed differently from the first behavioral information may include a portion of the second data similar to the portion of the first behavioral information that is of interest to the user.

In some embodiments, the user input may identify a portion of the first behavioral information that is of no interest to the user as at least a portion of the user preference information. The second behavioral information that is displayed differently from the first behavioral information may exclude a portion of the second data similar to the portion of the first behavioral information that is of no interest to the user.

In some embodiments, the instructions may further cause the processor to perform processing including displaying an option to adjust a user account setting based on at least one of the first behavioral information and the second behavioral information on the display, receiving a user command through the input device in response to the option, and sending the user command to the financial account server device.

BRIEF DESCRIPTION OF THE FIGURES

FIGS. 4A-4L show a dynamic interface according to an embodiment of the present disclosure.

DETAILED DESCRIPTION OF SEVERAL EMBODIMENTS

Systems and methods described herein may provide a dynamic user interface for financial services and/or products. The dynamic user interface may provide unique analytical data in addition to and/or in place of basic account data. For example, systems and methods described herein may evaluate user financial data to generate metadata indicating analytical insights. Systems and methods described herein may aggregate and/or anonymize sensitive data regarding peer users (e.g., users having one or more financial, transactional, and/or behavioral traits in common) to generate analytical insights. To generate these insights, the systems and methods described herein may be configured to function in specific data environments involving sensitive and/or proprietary information and data structures. Systems and methods described herein may be configured to modify dynamic interfaces on a remote user device in a real-time and/or dynamic fashion. For example, systems and methods described herein may be configured to provide user-oriented tools for modifying the dynamic interfaces in a mobile environment with display space and configuration constraints.

Figure 1:
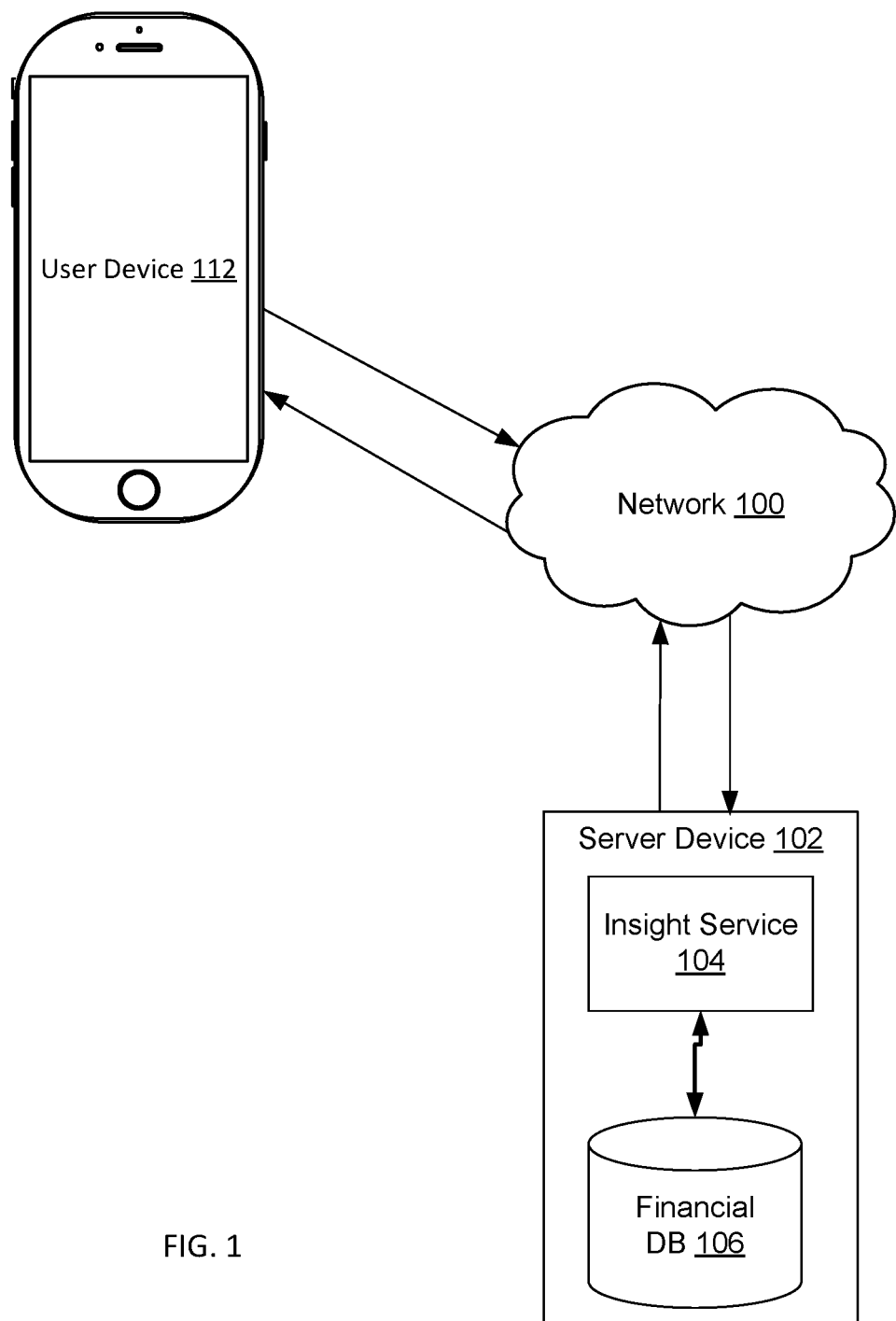
FIG. 1 shows a network providing dynamic interfaces according to an embodiment of the present disclosure.

FIG. 1 shows a network 100 providing dynamic interfaces according to an embodiment of the present disclosure. User device 112 may present dynamic interfaces to a user and/or receive inputs from the user through the dynamic interfaces, as described herein. User device 112 may be a smartphone, tablet, computer, or other device configured to facilitate user interaction with a user interface. User device 112 may communicate with server device 102 by network 100 (e.g., the Internet or another public and/or private network). In some embodiments, user device 112 may receive data used to generate and/or present dynamic interfaces from server device 102 and/or may report data gathered from user interactions to server device 102. While a single user device 112 is shown in FIG. 1, any number of user devices 112 may communicate with server device 102 by network 100 and/or may present user interfaces as described herein.

Server device 102 may be configured to analyze data, such as user account data, to generate insights that may be presented to the user. For example, server device 102 may include insight service 104, which may be configured to process user data and communicate with user device 112, and financial database 106, which may be configured to store data that is analyzed by insight service 104. Server device 102 is depicted as a single server including a single insight service 104 and financial database 106 for ease of illustration, but those of ordinary skill in the art will appreciate that server device 102 may be embodied in different forms for different implementations. For example, server device 102 may include a plurality of servers and/or a plurality of insight service 104 and/or financial database 106 instances.

Figure 2:
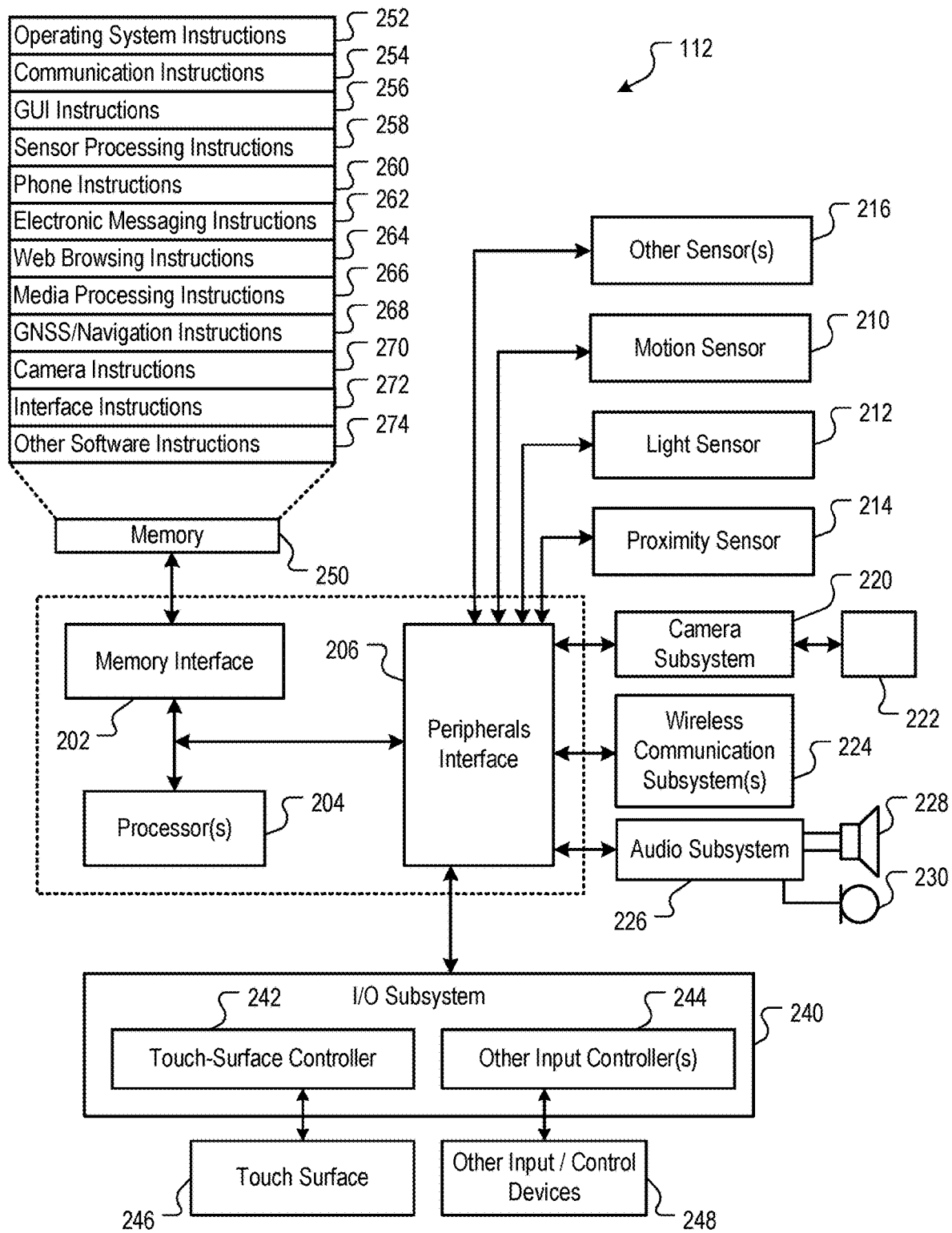
FIG. 2 shows a user device according to an embodiment of the present disclosure.

FIG. 2 shows a block diagram of an example computing device, for example a computing device configured to function as user device 112. For example, user device 112 may interact with server device 102 to present a dynamic interface to a user as described herein. The user device 112 may include a memory interface 202, one or more data processors, image processors, central processing units 204, and a peripherals interface 206. The memory interface 202, the one or more processors 204, and/or the peripherals interface 206 may be separate components or may be integrated in one or more integrated circuits. The various components in the user device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 224. The specific design and implementation of the communication subsystems 224 may depend on the communication network(s) over which the user device 112 is intended to operate. For example, the user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voice printing, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the user device 112 may present recorded audio and/or video files, such as MP3, AAC, and MPEG files. In some implementations, the user device 112 may include the functionality of an MP3 player, such as an iPod™. The user device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store dynamic interface instructions 272 to facilitate other processes and functions, such as communicating with server device 102 to receive dynamic interface information, displaying dynamic interface information, and/or processing user interactions with the dynamic interface as described herein.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the user device 112 may be implemented in hardware and/or in software, including in one or more signal processing and/or application specific integrated circuits.

Figure 3:
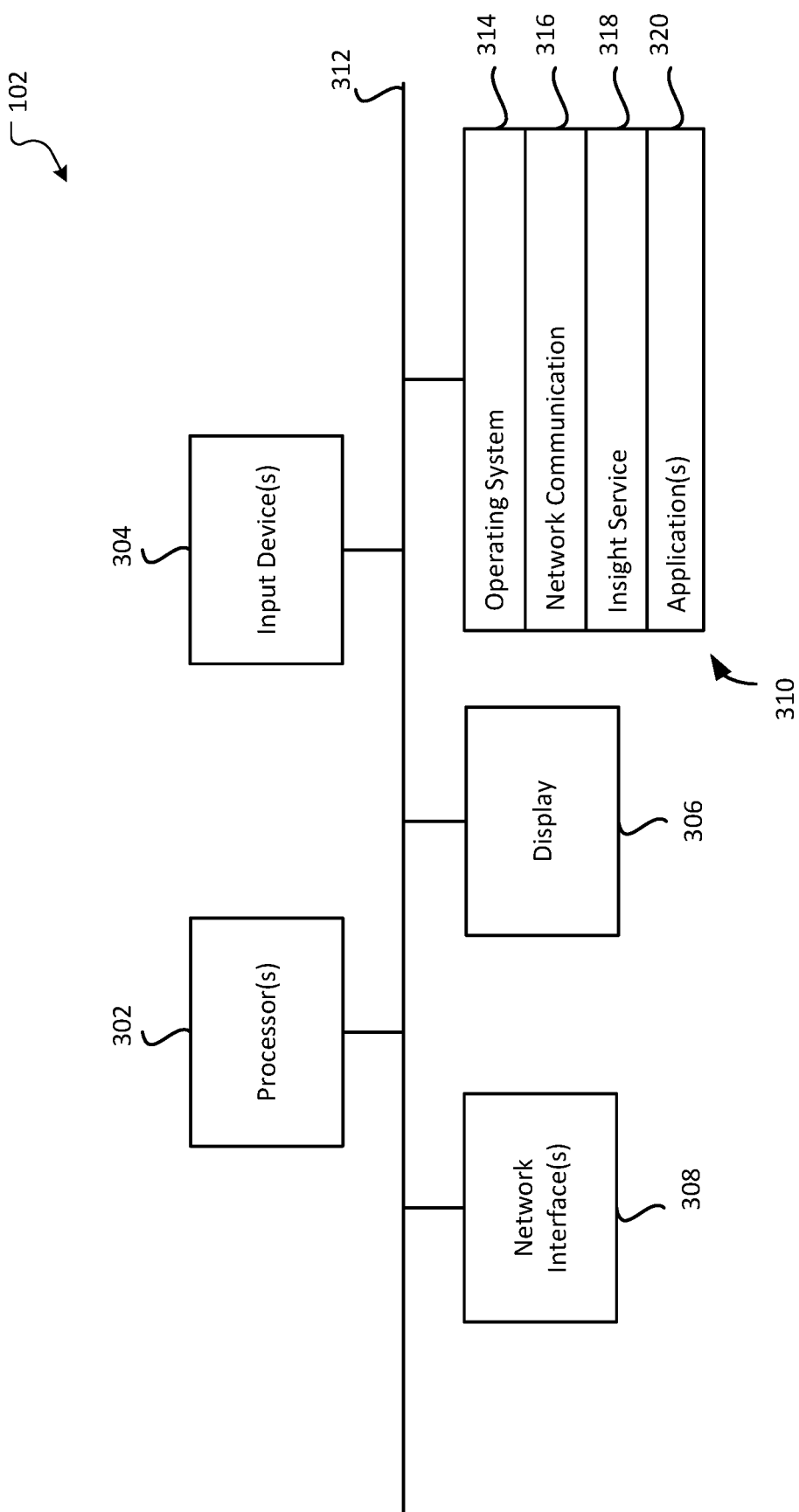
FIG. 3 shows a server device according to an embodiment of the present disclosure.

FIG. 3 is a block diagram of an example server device 102 that may implement various features and processes as described herein. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Insight service instructions 318 can include instructions that perform data analysis and transformation and generate dynamic interface information as described herein. For example, insight service instructions 318 may evaluate user transaction data to generate additional metadata facilitating dynamic interface presentation (e.g., associating disparate transactions into unified events and/or categories), aggregate and/or anonymize sensitive data regarding peer users to facilitate some dynamic interface element presentations, modify and/or inject dynamic interface element scripts into an interface being displayed by user device 112, and/or perform other processing as described herein.

Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

FIGS. 4A-4L show a dynamic interface according to an embodiment of the present disclosure. In the illustrated examples, a user may access an application or a web interface with user device 112 (e.g., the user may log into a user account and access a dynamic interface that may be tailored to the specific user of the account). The illustrated dynamic interface includes several example presentation types that deliver several example pieces of data to the user of user device 112. The examples provided in FIGS. 4A-4L are not intended to be exhaustive. The dynamic interface described herein may be configured to present different data in different formats with similar underlying processing to the examples illustrated in FIGS. 4A-4L. The dynamic interface provides various features and functionalities enabling customization of interface arrangement and/or data presented through the interface without requiring the use of settings menus and the like. Accordingly, as described below, the dynamic interface may improve customization and/or personalization of mobile or other space-constrained user interfaces.

Figure 4A:
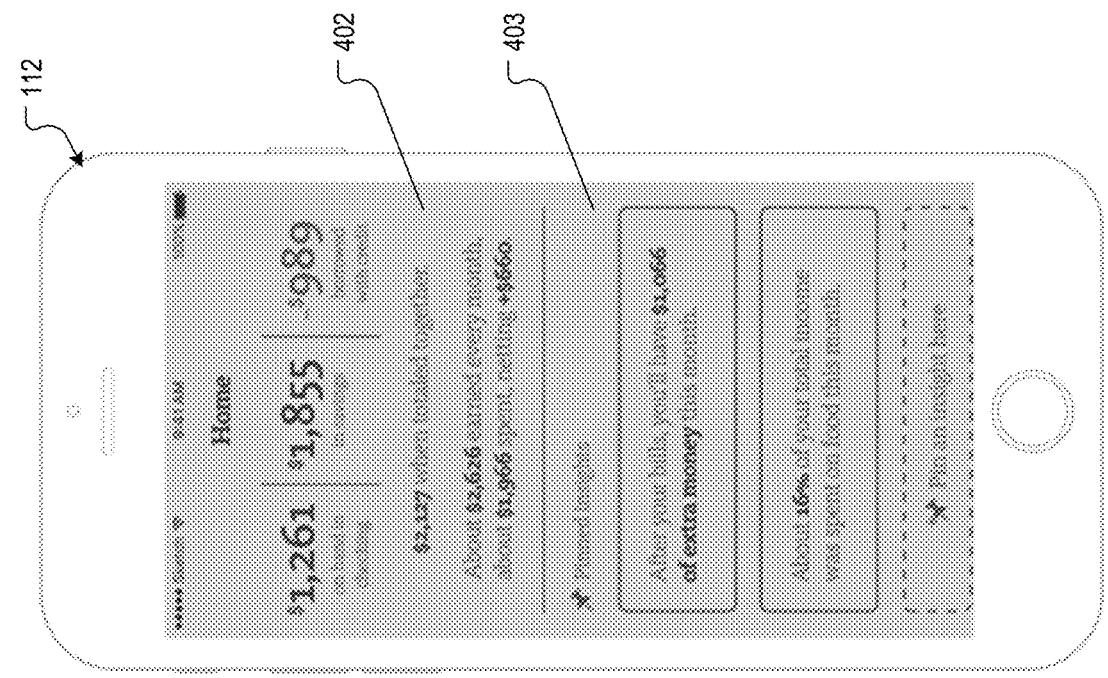
Figure 4A:
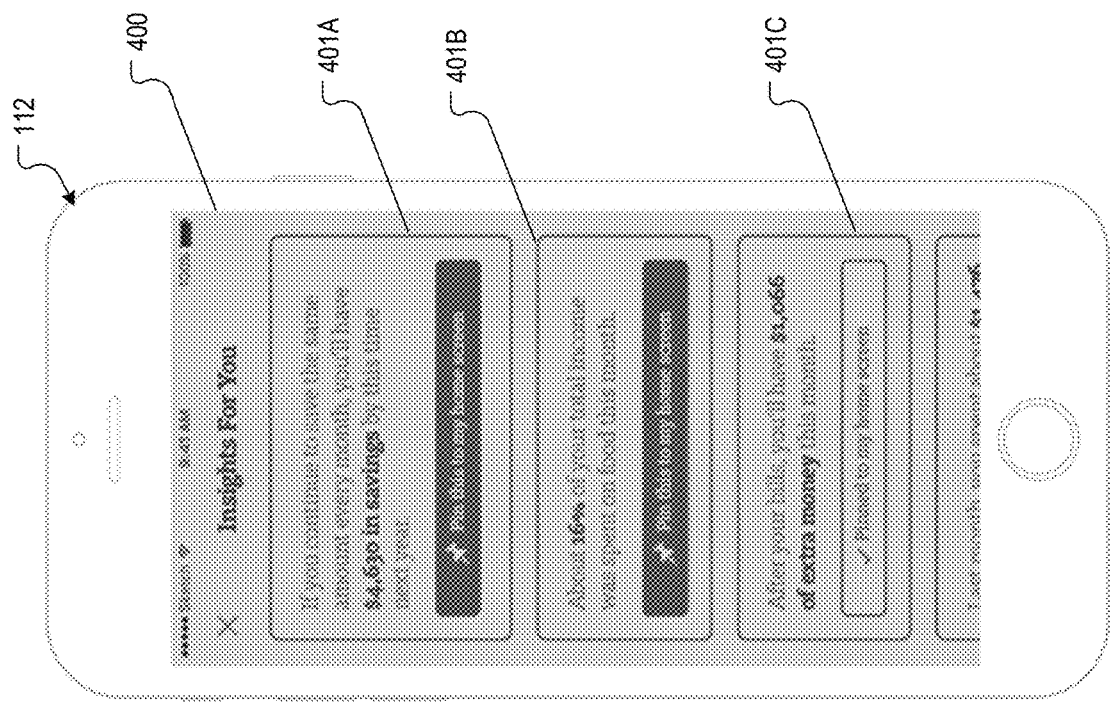

FIG. 4A shows a pinnable insights portion of the dynamic interface. As described in detail below, insight service 104 may analyze user data and/or data related to other users and generate insights tailored to the user based on the analyzing. Insight service 104 may send data describing the insights to user device 112. User device 112 may present the data to the user in an insight feed 400 including one or more insight cards 401. Insight cards may be user interface elements configured to fit modularly into varied interfaces and/or contexts. For example, FIG. 4A illustrates insight feed 400 including three insight cards 401A, 401B, 401C. Each insight card 401A, 401B, 401C may show a separate insight. Each insight card 401A, 401B, 401C may include an option to pin the insight to a home screen of the dynamic interface (e.g., where pinning may cause the insight to persist on the home screen and be updated dynamically as new data is generated over time).

FIG. 4A also shows home screen 402 of the dynamic interface. The user may be able to switch between insight feed 400 and home screen 402 using a menu interface, links, or other interface features, for example (not shown). Home screen 402 may include basic information about the user's accounts (e.g., values associated with a checking account, savings account, and credit card account). Home screen 402 may also include one or more basic insights (e.g., total value of the accounts and value incoming and outgoing each month). In addition, home screen 402 may include pinned insights 403, which may be insights pinned to home screen 402 from insight cards 401. For example, insight cards 401 may be pinned to home screen 402 through a user selection within insight card 401 itself. Accordingly, the user may be able to customize home screen 402 appearance by interacting with insight card 401, rather than changing settings in a home screen menu or the like.

Figure 4B:
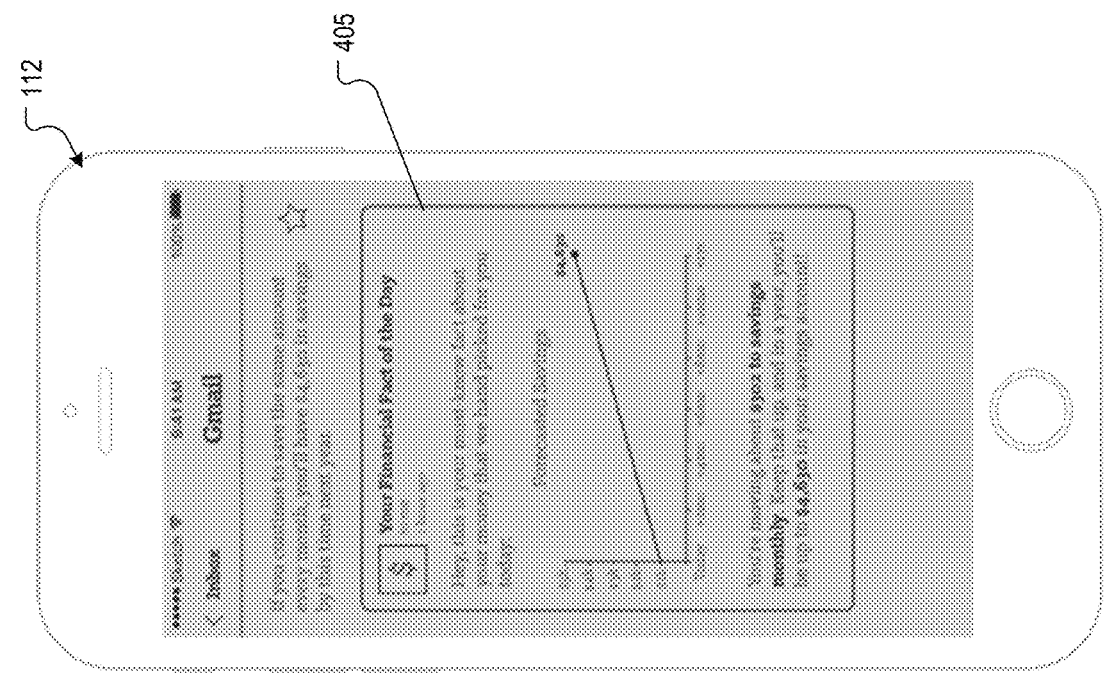
Figure 4B:
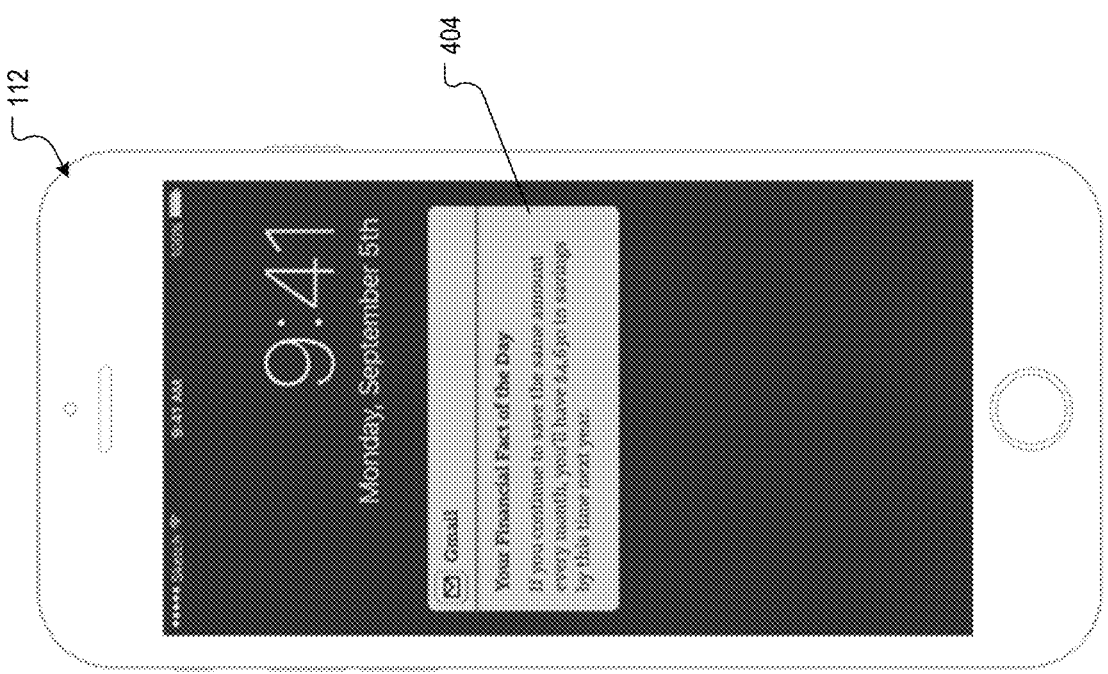

FIG. 4B shows a fact of the day screen 405 of the dynamic interface. User device 112 may display a notification 404 on a lock screen or other screen, for example a screen unrelated to dynamic interface instructions 272. Notification 404 may include some details about a fact of the day. By clicking on notification 404, the user may navigate to fact of the day screen 405, which may display further details about the fact of the day. In some embodiments, user device 112 may deliver the fact of the day in other ways, such as by email, text message, or other delivery techniques.

Figure 4C:
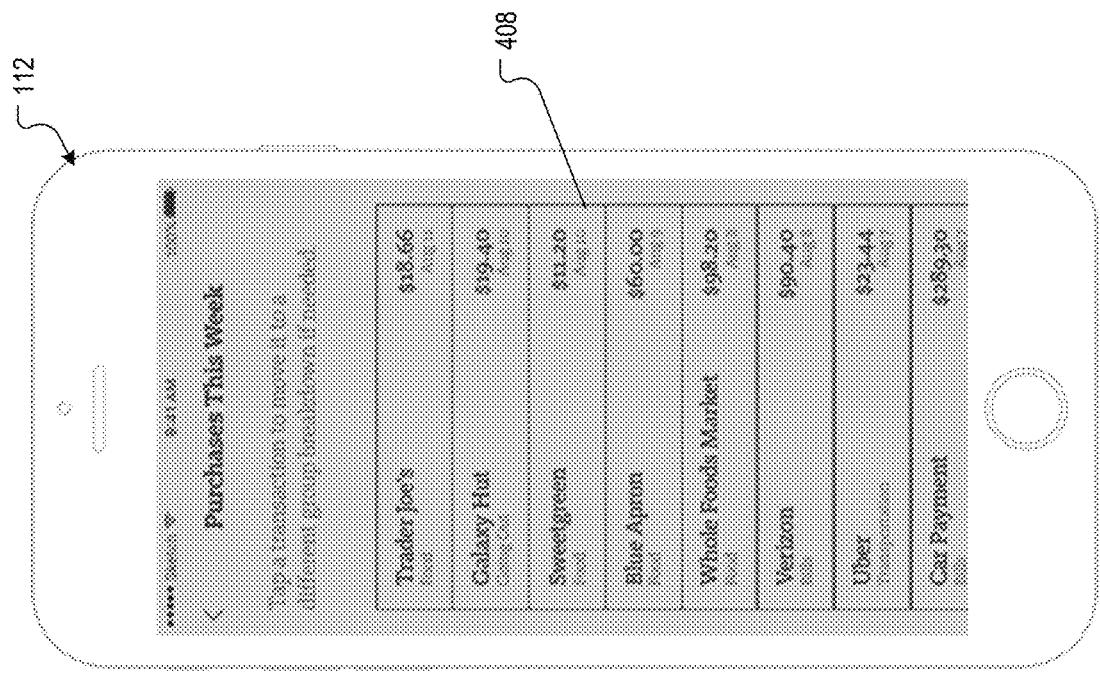
Figure 4C:
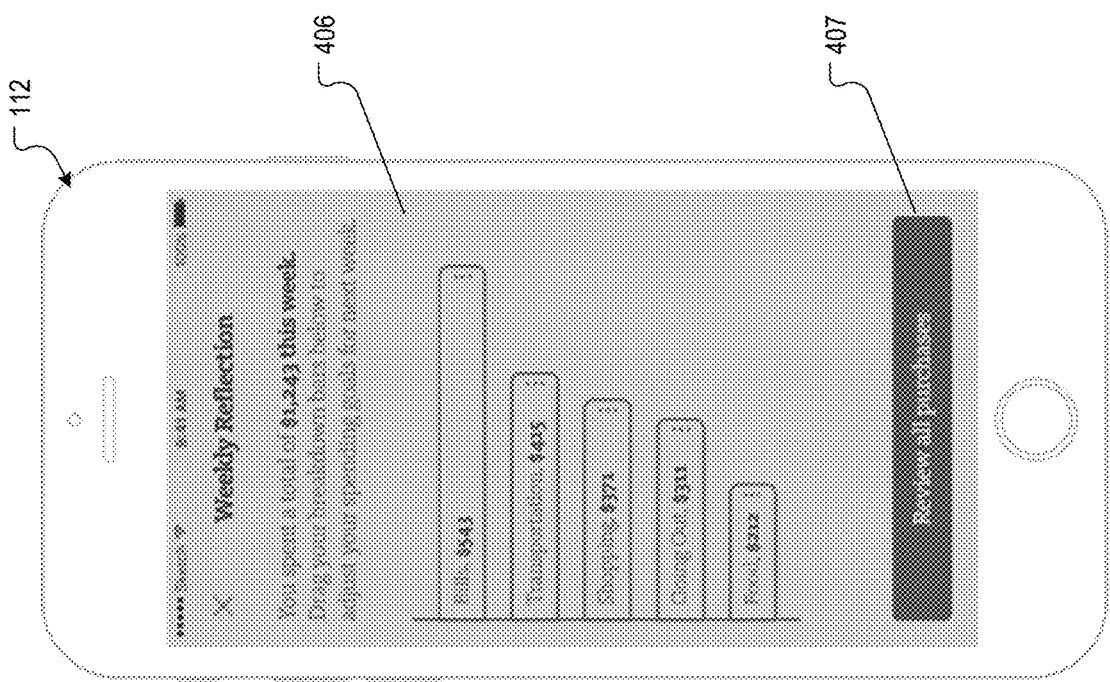

FIG. 4C shows a weekly reflection screen 406 of the dynamic interface. Weekly reflection screen 406 may illustrate a breakdown of how the user spent money during a week. For example, the breakdown of FIG. 4C includes a plurality of bars showing weekly spend for a plurality of expense categories. In some embodiments, a user may be able to adjust the bars (e.g., to add money or subtract money) to set spending goals for a following week (e.g., spend less on transportation by making the transportation bar smaller or spend more on food by making the food bar bigger). Weekly reflection screen 406 may include an option to review specific purchases 407. Selecting this option may cause user device 112 to display a list of transactions 408. The transactions may indicate information such as a location, amount spent, date, and/or type of transaction. A user may be able to edit the type of transaction (e.g., Galaxy Hut is listed under "going out" because it is a bar, but the user may have visited Galaxy Hut to eat dinner and may move the Galaxy Hut entry into the "food" category). Accordingly, the user may be able to modify how transactions are classified through interaction with specific purchases 407, for example.

FIG. 4D shows a weekly card stack screen 409 of the dynamic interface. Weekly card stack screen 409 may include a plurality of cards indicating facts that may change on a weekly basis. For example, the facts may relate to the user's weekly spending, may be facts about the user's finances over a different period of time, and/or may be facts of general interest. Weekly card stack screen 409 may include swipe feature 410 allowing the user to cycle through the cards to see various facts and, at the same time, indicate whether they would like to see more information like that presented in the cards. For example, a user may be able to swipe right on a card to indicate that they are interested in the information, swipe left to indicate they are not interested, or vice versa. After the swipe, weekly card stack screen 409 may present a different swipeable card. Swiping through the available cards until all cards have been displayed may cause user device 112 to show additional details 411, which may include reward information 411A (e.g., a an inspirational quote as a reward for viewing all the cards) and/or specific encouragement 411B (e.g., an indication of how often the user swiped to evaluate cards in a recent period). By indicating which information is relevant in this way, the user may be able to affect future card presentations. For example, user device 112 may store data indicating which cards in the stack were indicated as interesting and which were not, so that future presentations of weekly card stack screen 409 may include cards more similar to the former. Accordingly, the user may be able to customize weekly card stack screen 409 without explicitly providing interests in a settings menu or the like.

Figure 4E:
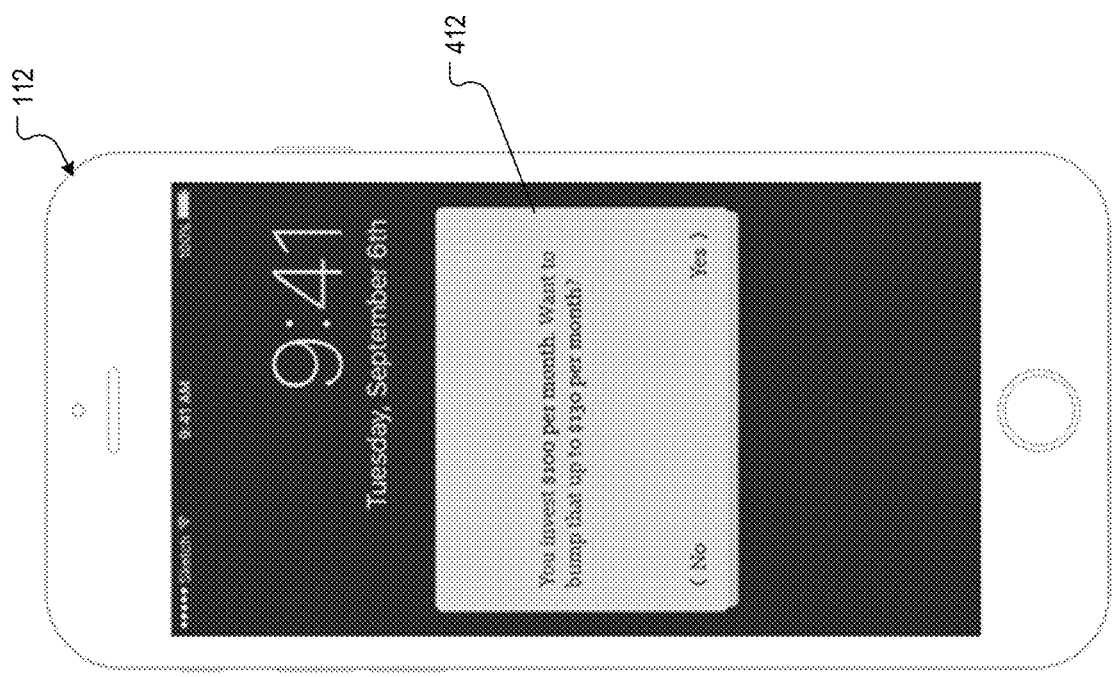
Figure 4E:
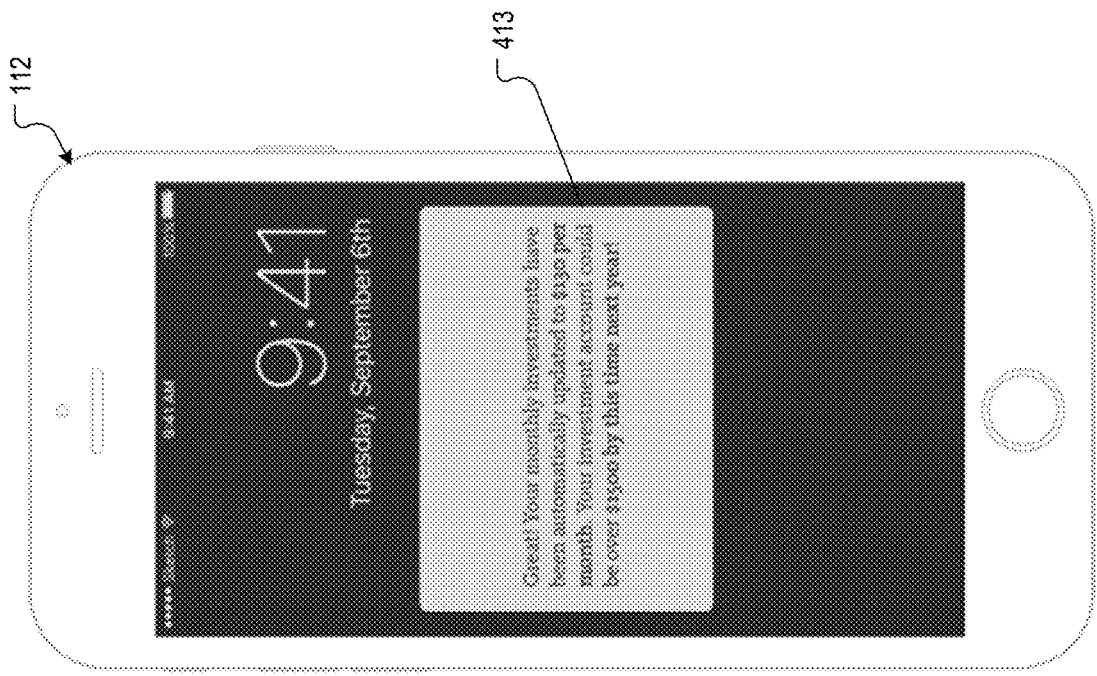

FIG. 4E shows a choose your own future screen 412 of the dynamic interface. Choose your own future screen 412 may present one or more cards suggesting one or more options for changing settings associated with one or more financial accounts. The options may be generated through analysis of the user's financial information in some embodiments. For example, as shown in FIG. 4E, a card may suggest increasing an amount of money placed in an investment account each month. This may be presented because the user consistently has enough money in a checking account each month to invest more, for example. The user may interact with the card (e.g., to accept or refuse the offer) and, in response, user device 112 may present an indication of the user's selection 413. In the illustrated example, the user has chosen to increase the investment amount. Indication 413 may be displayed after the user's automatic withdrawal settings have been reset in response to the user's selection. Accordingly, the user may be able to customize account settings through interaction with cards on the choose your own future screen 412, as opposed to manually changing recurring account actions, for example.

Figure 4F:
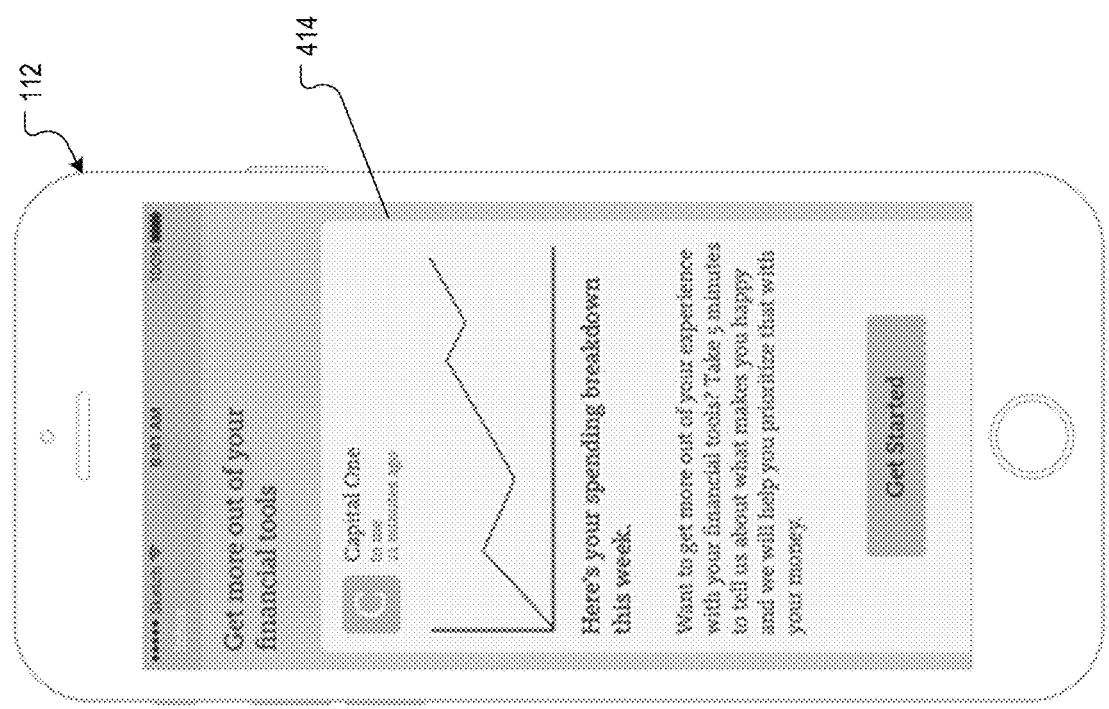

FIG. 4F shows a newsletter screen 414 of the dynamic interface. Newsletter screen 414 may be delivered by email, for example. Newsletter screen 414 may include some information about the user's financial situation and/or may include a link to other interfaces described herein, such as home screen 402.

Figure 4G:
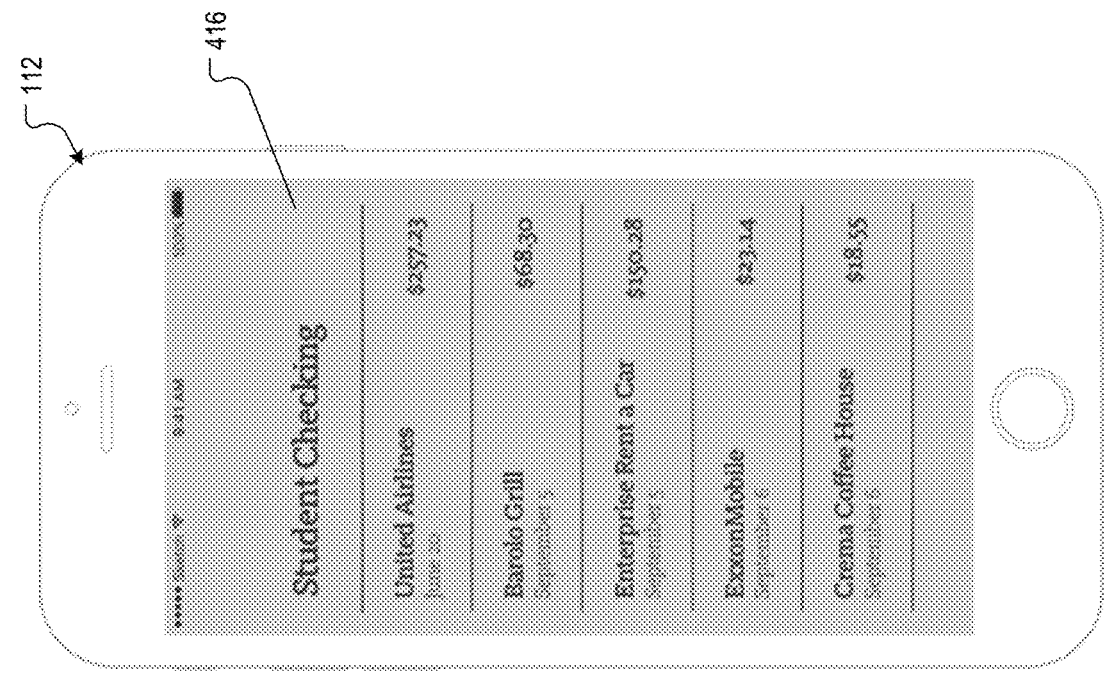
Figure 4G:
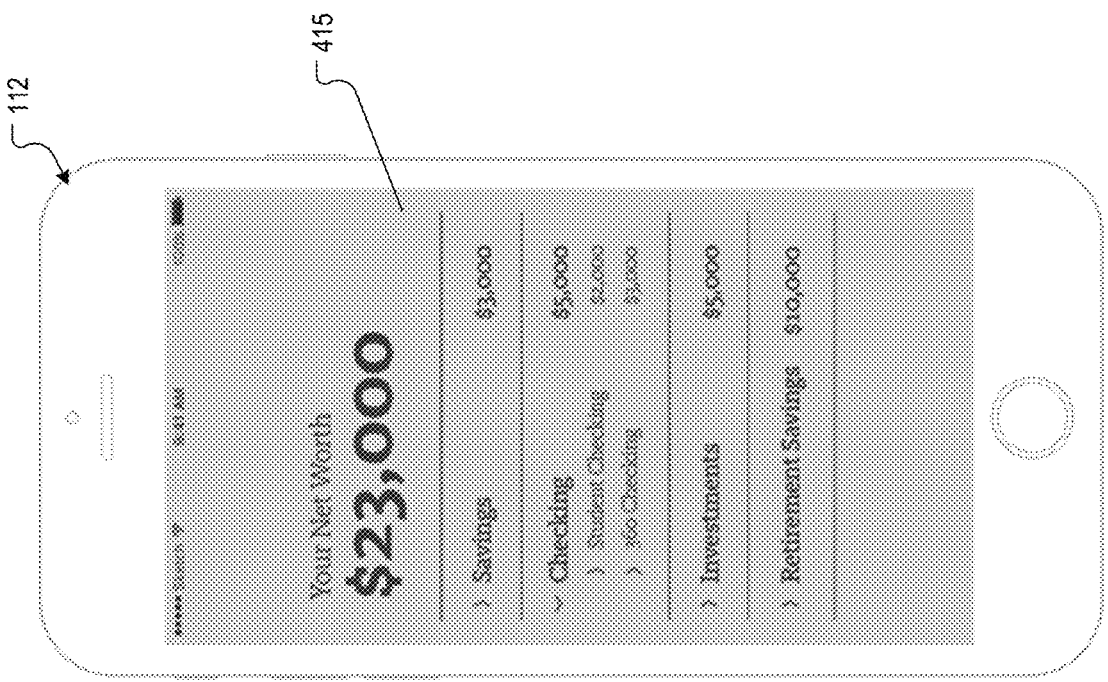

FIG. 4G shows a net worth breakdown screen 415 of the dynamic interface. Net worth breakdown screen 415 may show a user's total net worth and may break the value down by category (e.g., savings, checking, investments, and retirement savings in the example of FIG. 4G). A user may be able to select a category and see further breakdowns (e.g., multiple checking accounts as shown in FIG. 4G). In some embodiments, the user may be able to select a category and cause user device 112 to show an individual category breakdown screen 416 (e.g., a single account with specific transactions as shown in FIG. 4G).

Figure 4H:
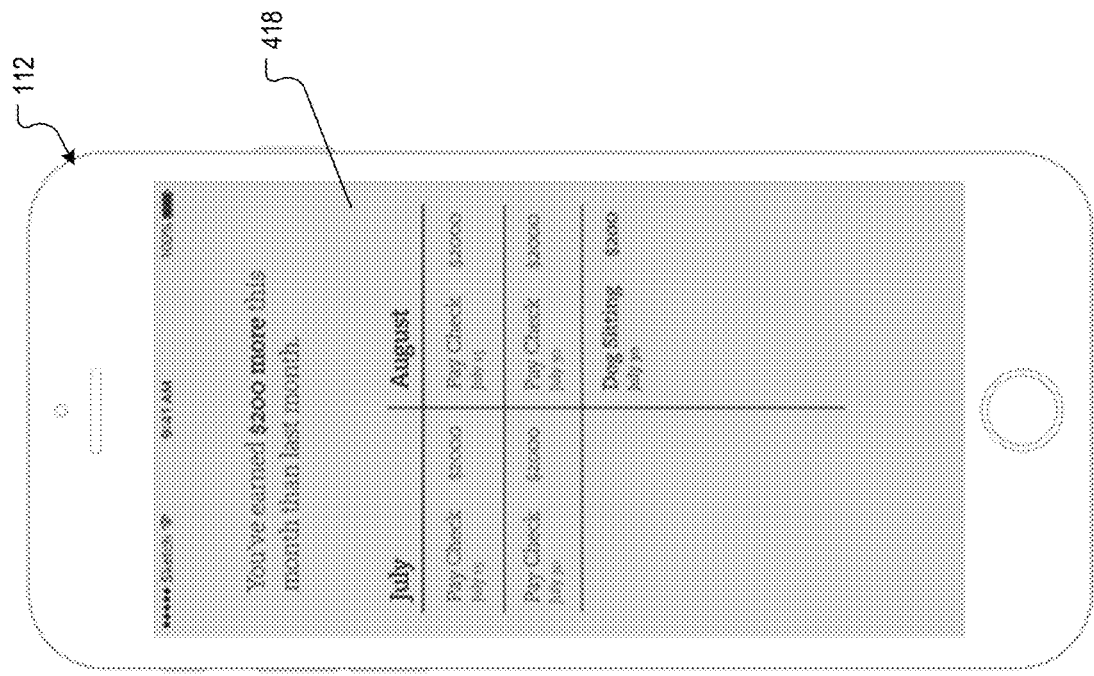
Figure 4H:
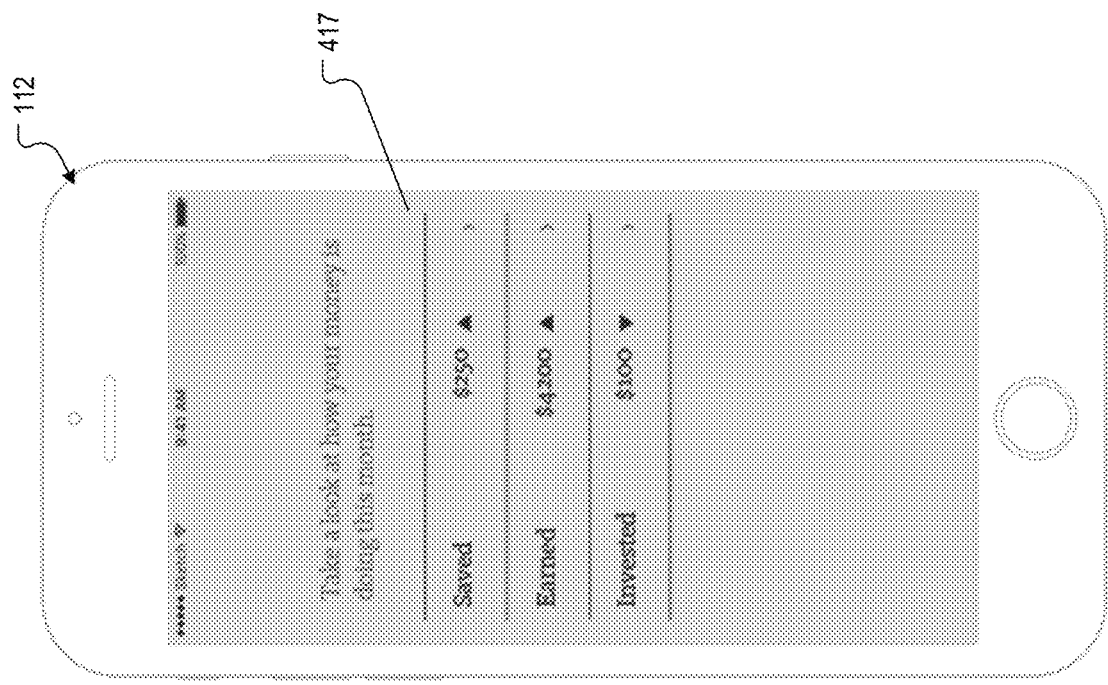

FIG. 4H shows a pattern change screen 417 of the dynamic interface. For example, pattern change screen 417 may show how a user's financial patterns have changed from one month over the previous month (or other time period). The example of FIG. 4H shows savings increasing, earnings increasing, and investments decreasing month-to-month. A user may be able to select one of the categories, which may cause user device 112 to present a category details screen 418. Category details screen 418 may show specific breakdowns of why the category changed from one month to the next.

Figure 4I:
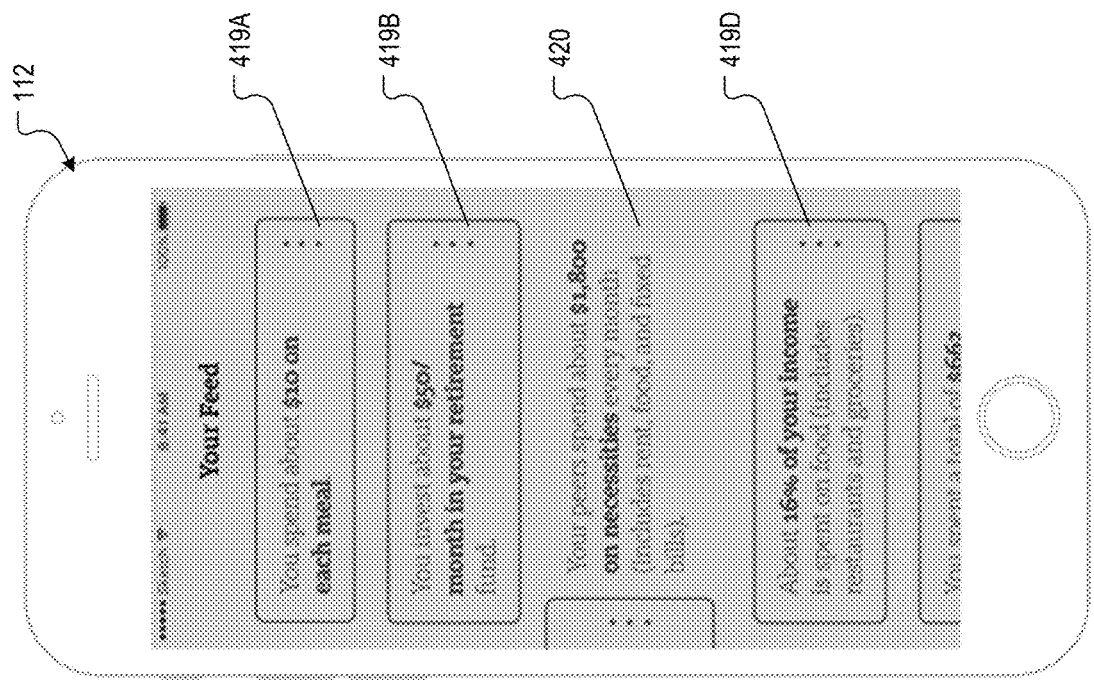
Figure 4I:
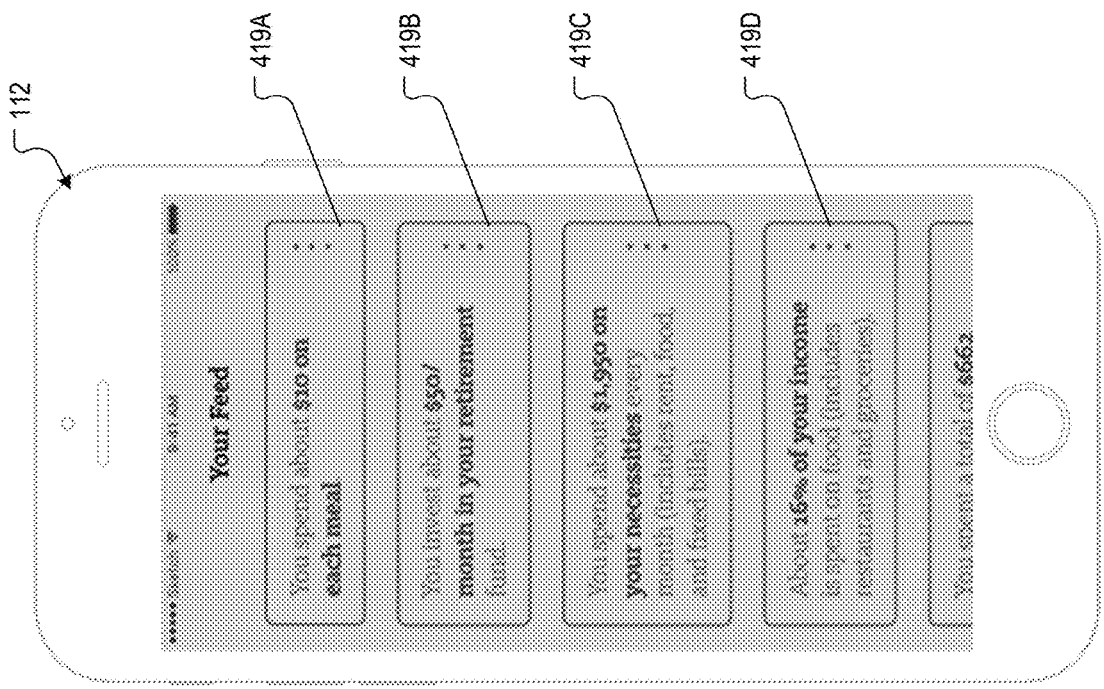

FIG. 4I shows a feed with comparisons screen 419 of the dynamic interface. User device 112 may present one or more cards 419A-419D with insights about a user's finances. The cards 419A-419D may be swipeable or otherwise selectable so that when selected, a card 419C may change to show insights about peer users 420. For example, the insights about peers may be an average value of a same insight data point for a group of other users similar to the user in some way (e.g., age, income, location, etc.). Insight service 104 may have access to data about many users and may analyze the data to identify peers and generate insights about the peers as a group without identifying specific peers. In some embodiments, insight service 104 may provide information about how the peers are determined and/or may allow a user to adjust the definition of peer. For example, user device 112 may provide an interface showing how peers are defined (e.g., same zip code and same income bracket) and allowing the user to change the definition (e.g., change to same zip code and similar set of merchants frequented). Insight service 104 may update the peer definition, and future comparisons may reflect the changes.

Figure 4J:
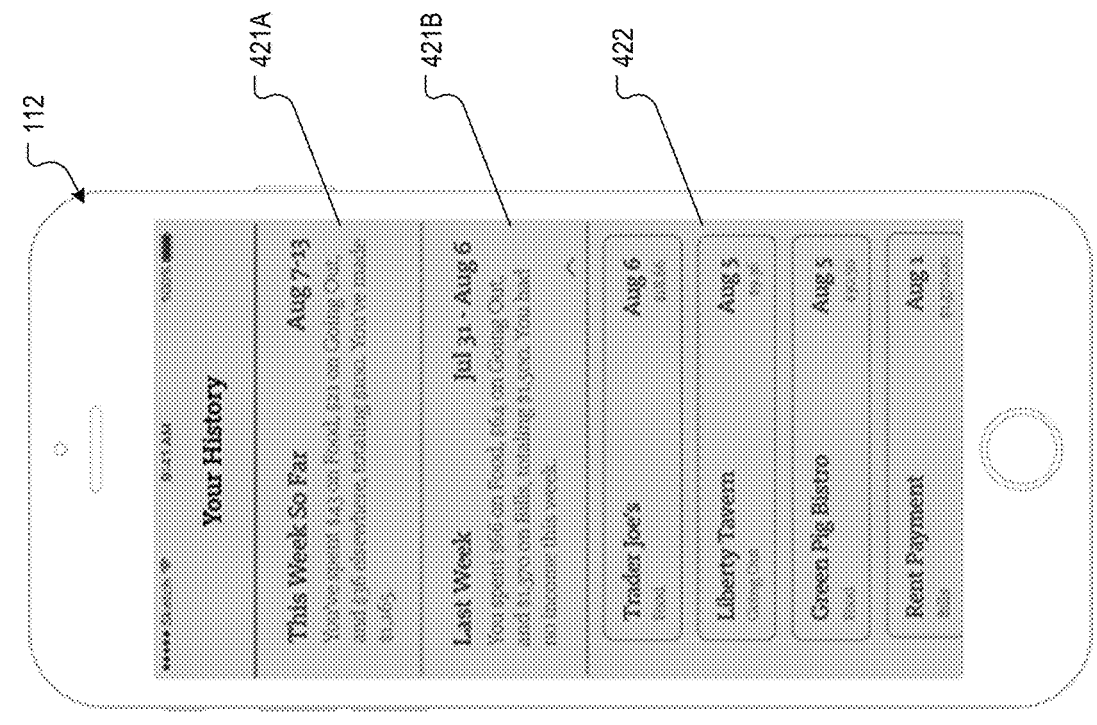
Figure 4J:
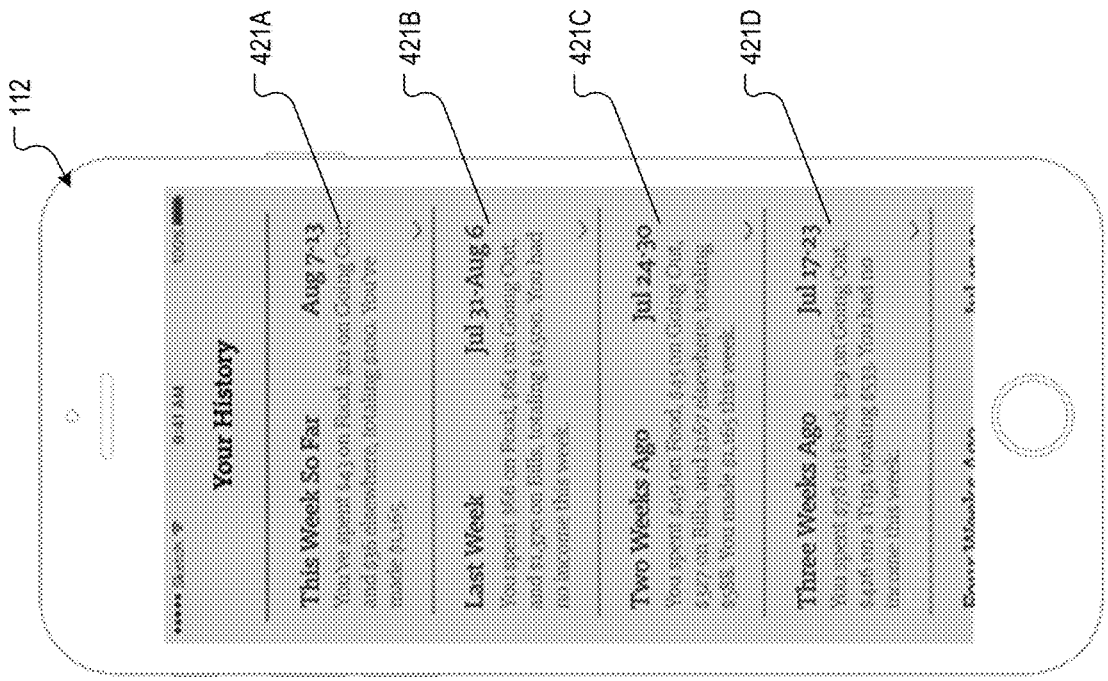

FIG. 4J shows a feed with summaries screen 421 of the dynamic interface. User device 112 may present one or more insights 421A-421D about a user's finances. For example, the insights 421A-421D may include insights for different historical periods, such as a current week and previous weeks as in the example of FIG. 4J. The user may be able to swipe, click, or otherwise select insight 421C, and user device 112 may show details about the selected insight 422. For example, selecting a particular week may bring up a list of financial transactions incurred during the selected week, as shown in FIG. 4J.

Figure 4K:
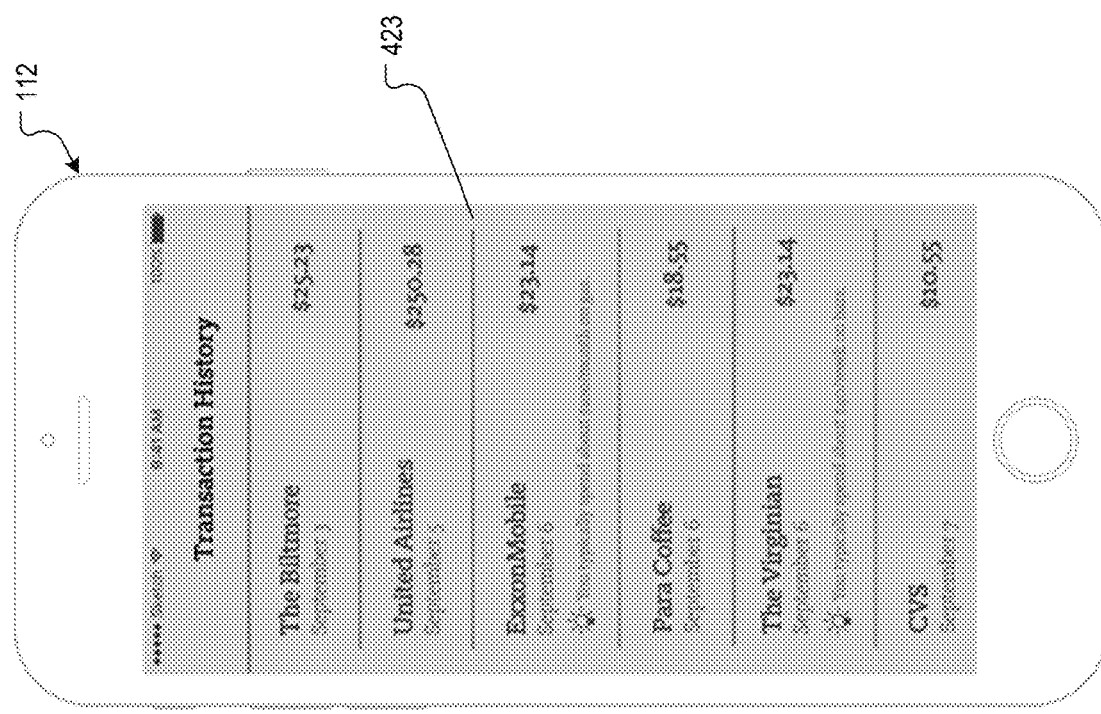

FIG. 4K shows a transaction history and insight screen 423 of the dynamic interface. Transaction history and insight screen 423 may show a list of previous financial transactions the user has incurred. Some or all of the transactions may include insights related to the transactions. For example, as shown in FIG. 4K, the ExxonMobil transaction was determined to be a gas purchase (or likely to be a gas purchase) as described herein, and transaction history and insight screen 423 includes an insight indicating how much the user spends on gas in a month.

Figure 4L:
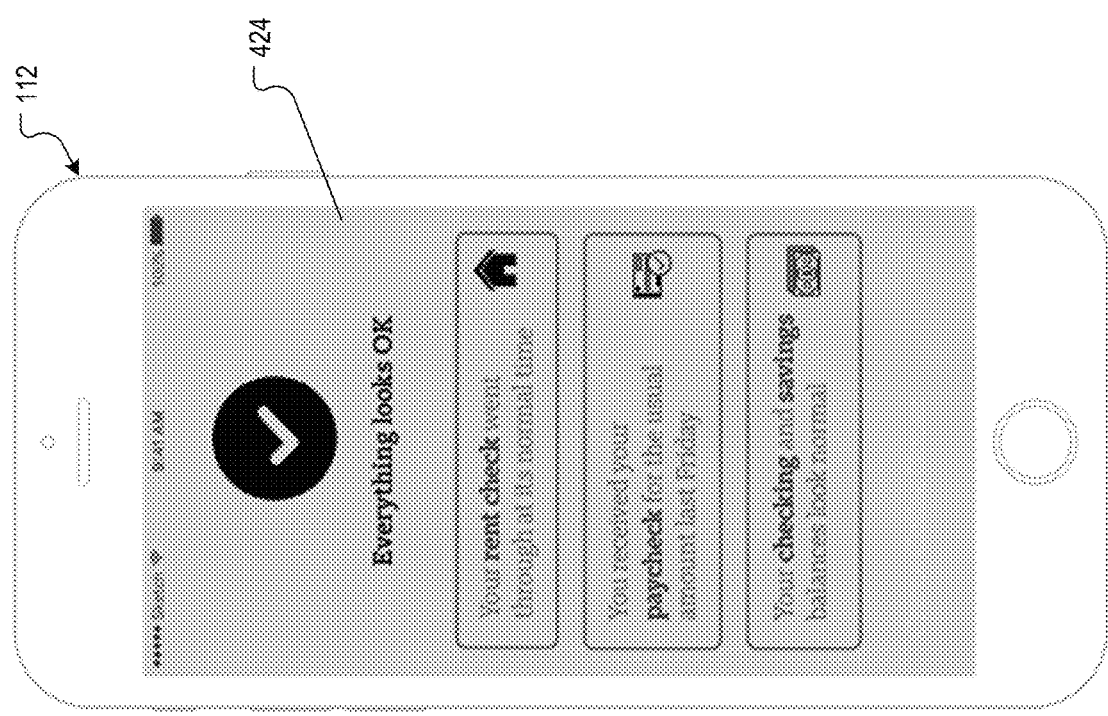

FIG. 4L is a quick look screen 424 of the dynamic interface. Quick look screen 424 may provide a summary of insights, for example showing that everything is OK as in FIG. 4L or highlighting any major issues in other examples. In FIG. 4L, everything is OK because expected debits and credits processed normally and accounts have normal balances. The user may be able to select the summary elements to view details about the topic that contribute to it being OK.

For example, clicking on the summary indicating that the checking and savings balances look normal may cause user device 112 to display details about the current state of these accounts and/or recent transactions associated with the accounts.

Figure 5:
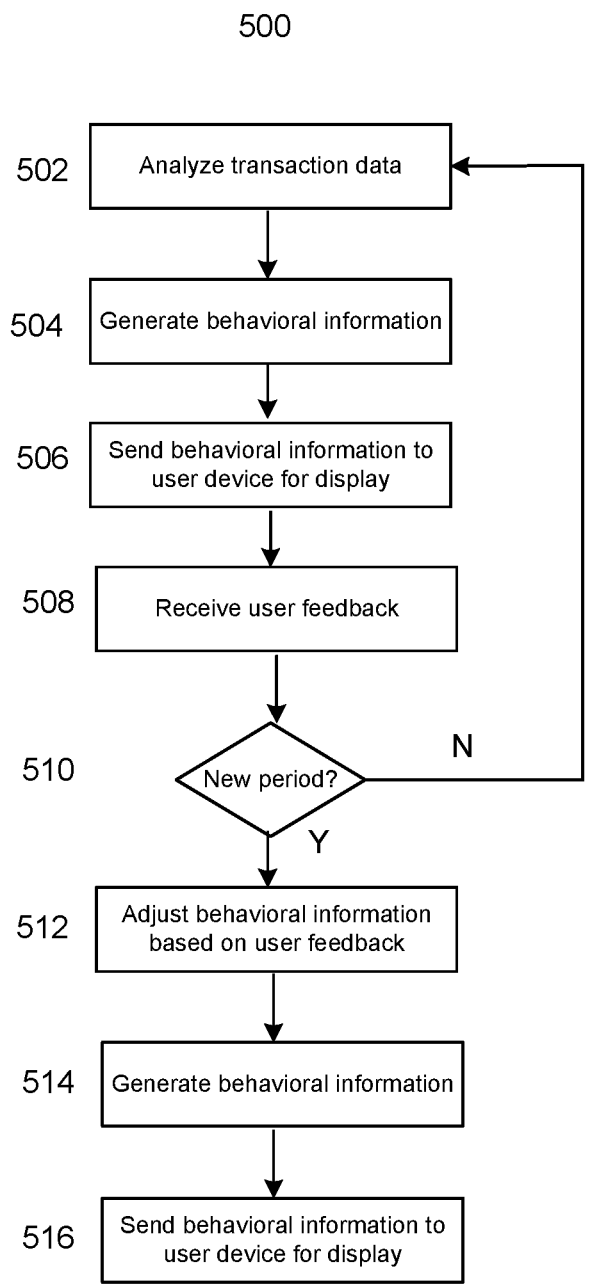
FIG. 5 shows an interface generation process according to an embodiment of the present disclosure.

FIG. 5 shows an interface generation process 500 according to an embodiment of the present disclosure. Server device 102 may perform process 500 to generate behavioral information supporting insight displays presented by user device 112 (e.g., FIGS. 4A-4L). For example, insight service 104 may analyze user transaction data to formulate behavioral information which may be used to present insights beyond simple reporting of the transaction data. These insights may appear in the dynamic interface as described above. Process 500 may be used for generating a single piece of behavioral information, but in some embodiments, server device 102 may perform process 500 to analyze multiple pieces of transaction data and/or perform multiple different types of analysis in order to support display of multiple insights on one or more screens of the dynamic interface.

At 502, server device 102 may analyze transaction data for a user of user device. For example, financial database 106 may contain records of transactions involving one or more user accounts. Financial database 106 may contain records related to credit cards, checking accounts, savings accounts, and/or other financial accounts. Transaction data may include information such as a merchant and/or location of the transaction, a time of the transaction, and/or an amount of the transaction. In some embodiments, financial database 106 may contain additional data and/or metadata providing further details about the transaction. For example, server device 102 may be configured to determine a transaction category and/or an underlying activity surrounding the transaction (e.g., by grouping transactions together that are closely linked in time and/or place, server device 102 may determine that the transactions all relate to a single trip or event; and/or using metadata about transaction category type, brand, and/or location, server device 102 may determine that a set of transactions relate to one another owing to one or more similar transaction characteristics). For example, detailed descriptions of systems and methods related to determining transaction categories and/or underlying activities and/or other details related thereto are described in U.S. patent application Ser. No. 16/107,571 filed on Aug. 21, 2018, U.S. patent application Ser. No. 16/107,480 filed on Aug. 21, 2018, and U.S. patent application Ser. No. 16/107,524 filed on Aug. 21, 2018, which are each incorporated by reference in their entirety.

Insight service 104 may gather information from financial database 106 as specified by one or more scripts. For example, each insight card described above may be generated by a specific script and/or combination of scripts. To generate a card, insight service 104 may start executing its script. The script may direct insight service 104 to extract specific data from financial database 106.

At 504, server device 102 may generate behavioral information, for example as an outcome of processing the script for a card. The behavioral information may illustrate one or more insights. For example, in card 401B of FIG. 4A, the behavioral information generated at 504 indicates that about 16% of the user's total income was spent on food. Insight service 104 may have determined this by gathering all information for the month related to income and to food purchases from financial database 106 and determining what percentage of income was spent on food. The specific data to pull from financial database 106 and/or the specific equation or algorithm to use with the data may be defined by the script for card 401B.

Any scripts may be written for a card. By way of example only, a script may be configured to examine common strings of transaction types within a specific, closely-linked period of time. For example, a rideshare purchase, a restaurant purchase, a bar purchase, a ticket at an event space, and another rideshare purchase might indicate a 'night out,' and a single script may be written to find those patterns and identify them.

At 506, server device 102 may send behavioral information generated at 504 to user device 112. This may allow user device 112 to display the behavioral information, for example in the form of a card (e.g., card 401B) or other interface.

At 508, server device 102 may receive user feedback from user device 112. As noted above, user device 112 may present insights in a dynamic interface configured to accept user input. For example, the user may provide feedback indicating that the insight is useful (e.g., the user would like to see the insight in future time periods, and/or the user would like the insight to be more prominently displayed) or not useful (e.g., the user would not like to see the insight in future time periods, and/or the user would like the insight to be less prominently displayed).

At 510, server device 102 may determine whether a new reporting period for transaction data has begun. If not, server device 102 may continue generating behavioral information and receiving user feedback at 502-508. For example, as noted above, insight service 104 may generate data for multiple cards. Accordingly, insight service 104 may repeat 502-508 for different scripts. In some embodiments, the reporting period may be a predefined period and/or may be defined by the user (e.g., weekly, monthly, biweekly, or anchored to pay periods).

However, if a new reporting period for transaction data has begun (e.g., a new day, a new week, a new month, etc.), at 512, server device 102 may adjust its processing to generate behavioral information based on user feedback. For example, if a user has asked for a certain type of insight to be dropped from the dynamic interface, insight service 104 may remove the associated script from a set of scripts to be processed. In another example, if a user has asked for insights that were not previously presented, insight service 104 may add a script for providing such insights if one is available.

At 514, server device 102 may generate behavioral information, for example as an outcome of processing the script for a card. The behavioral information may illustrate one or more insights. This processing may be similar to the processing of 504, for example, but may be based on updated transaction data in transaction database 506.

At 516, server device 102 may send behavioral information generated at 514 to user device 112. This may allow user device 112 to display the behavioral information, for example in the form of a card (e.g., card 401B) or other interface. While process 500 shows only one new period changeover at 510, it may be understood that server device 102 may receive further feedback and perform additional iterations of various steps of process 500 over time after step 516.

Figure 6:
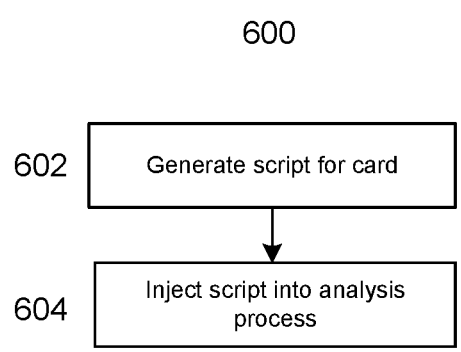
FIG. 6 shows an interface updating process according to an embodiment of the present disclosure.

FIG. 6 shows an interface updating process 600 according to an embodiment of the present disclosure. Server device 102 may perform process 600 to facilitate presentation of new types of insights and/or new cards within the dynamic interface. Server device 102 may perform process 600 while interface generation process 500 is active in some embodiments, thereby allowing new insight cards to be inserted into the dynamic interface on the fly.

At 602, server device 102 may generate a script for a card. For example, insight service 104 may receive instructions for generating the script from an admin or programmer through a user interface in communication with server device 102. In another example, insight service 104 may receive instructions for generating the script from other sources (e.g., other instances of insight service 104 may share script instructions). The instructions may define the look and feel of a card, where and/or when the card may be displayed, what data the card may include, how a user may interact with the card, and/or other parameters. Insight service 104 may configure the card so that its code may access appropriate data within financial database 106. For example, if the card presents an insight related to the user's checking account withdrawals, insight service 104 may configure the code to access the user's checking account information within financial database 106. The code may access the information, perform processing to generate an insight, and present the insight (e.g., see examples of FIGS. 4A-4L above).

At 604, server device 102 may inject the script for the card into interface generation process 500. For example, as described above, insight service 104 may analyze transaction data at 502. Insight service 104 may analyze transaction data to generate insights for various cards providing various insights. Insight service 104 may inject the script for the card into process 500 so that the analysis may include the analysis prescribed by the new card, and the behavioral information generated at 504 and sent at 506 may include information for displaying the new card by user device 112.

Figure 7:
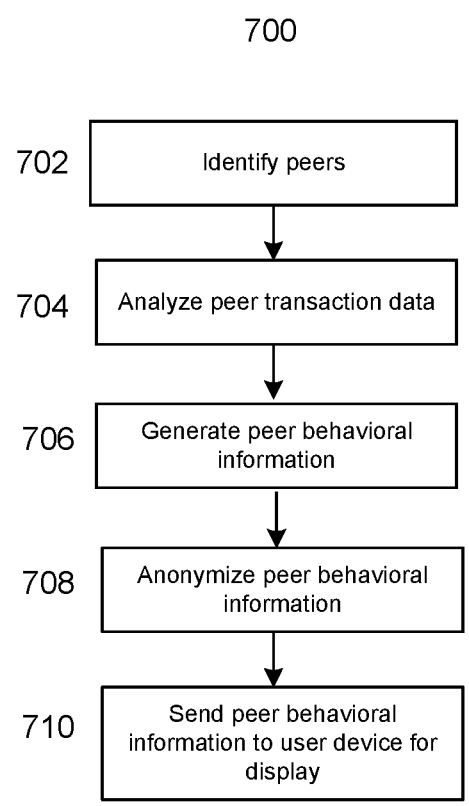
FIG. 7 shows an interface generation process according to an embodiment of the present disclosure.

FIG. 7 shows an interface generation process 700 according to an embodiment of the present disclosure. Server device 102 may perform process 700 to generate peer data for some insights (e.g., as shown in FIG. 4I). Peer data-based insights may invoke specific processing in some embodiments in order to anonymize and protect data that may be usable to identify peers. For example, as described above, server device 102 performing process 500 may analyze transaction data for a variety of insights at 502. If an insight analysis calls for inclusion of peer data, server device 102 may perform process 700 to provide the peer data. As noted above, in some embodiments, the user may be able to customize the peer definition.

At 702, server device 102 may identify one or more peers who are similar to the user being analyzed. For example, insight service 104 may identify other users meeting a predefined or user defined peer definition. Insight service 104 may select all or a subset of such identified users as peers for evaluation in the processing described below.

At 704, server device 102 may analyze transaction data for the identified one or more peers. For example, financial database 106 may contain records of transactions involving the peer accounts. Financial database 106 may contain similar data for the peer accounts as for the user account described above in the context of FIG. 5 in some embodiments. For example, financial database 106 may contain records related to credit cards, checking accounts, savings accounts, and/or other financial accounts. In some embodiments, financial database 106 may not store data that could be used to actually identify the peer (e.g., the data may be anonymized and/or aggregated), only data indicating how the peer may relate and/or compare with the user when anonymized and/or aggregated. Transaction data may include information such as a merchant and/or location of the transaction, a time of the transaction, and/or an amount of the transaction. In some embodiments, financial database 106 may contain additional data and/or metadata providing further details about the transaction. For example, server device 102 may be configured to determine a transaction category and/or an underlying activity surrounding the transaction (e.g., by grouping transactions together that are closely linked in time and/or place, server device 102 may determine that the transactions all relate to a single trip or event).

Insight service 104 may gather information from financial database 106 as specified by one or more scripts. For example, each insight card described above may be generated by a specific script and/or combination of scripts. To generate a card, insight service 104 may start executing its script. The script may direct insight service 104 to extract specific data from financial database 106.

At 706, server device 102 may generate behavioral information for the peers. The behavioral information may illustrate one or more insights. The specific data to pull from financial database 106 and/or the specific equation or algorithm to use with the data may be defined by the script being processed. Insight service 104 may pull similar data and perform similar processing for each of the peers for use in a script, for example, so that trends and/or averages may be detected.

By way of example only, a script may be configured to perform calculation for the insight, "in the past year, you spent 30% less on going out than people who live in the same area and make as much as you." The script may sum the amount the user has spent on 'going out' expenses (e.g., as defined in the example script described in relation to process 500 above), sum the amount for a personalized, anonymized and/or aggregate data set as defined by peer conditions (e.g., same area, same income), and calculate a percentage comparison.

At 708, server device 102 may anonymize the behavioral information. For example, insight service 104 may examine the behavioral information to detect any data that may be used to identify one or more of the peers (e.g., a name, account number, address, or other personal information). If insight service 104 detects any identifying data, insight service 104 may remove the identifying data from the behavioral information.

At 710, server device 102 may send behavioral information generated at 514 to user device 112. This may allow user device 112 to display the behavioral information, for example in the form of a card or other interface. If process 700 was instituted during performance of process 500, server device 102 may resume process 500 (e.g., receiving user feedback at 508).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of generating a user interface, the method comprising:
   receiving, at a processor, first data indicative of a first plurality of transactions by a user;
   processing, by the processor, the first data to generate first behavioral information describing the user, the first behavioral information having a first type selected from among a plurality of types of behavioral information;
   causing, by the processor, the first behavioral information to be displayed by an interactive user interface in an entry within a feed of information displayed by the interactive user interface;
   receiving, at the processor, a user input made in response to the first behavioral information being displayed through the interactive user interface, the user input including a selection of the entry;
   receiving, at the processor, second data indicative of a second plurality of transactions by the user;
   identifying, by the processor, second behavioral information describing the user within the second data, the second behavioral information having the first type;
   causing, by the processor and as a result of the identifying, the second behavioral information to be displayed by the interactive user interface;
   wherein the feed is accessible from a home screen of the interactive user interface and separate from the home screen;
   the second behavioral information is displayed by the interactive user interface in the home screen;
   the home screen includes a settings interface; and the user input is made through the settings interface.

2. The method of claim 1, wherein:
   processing the first data comprises:
      identifying a plurality of peer users having at least one characteristic in common with the user;
      receiving peer data indicative of a plurality of transactions by the peer users; and
      generating peer behavioral information describing the peer users; and
   the method further comprises causing, by the processor, the peer behavioral information to be displayed by the interactive user interface.

3. The method of claim 2, wherein the method further comprises preventing, by the processor, information identifying the peer users from being included in the peer behavioral information displayed by the interactive user interface.

4. The method of claim 1, wherein:
   processing the first data comprises using at least one script to generate at least one entry; and
   the interactive user interface includes the at least one entry.

5. The method of claim 4, further comprising generating, by the processor, the at least one script.

6. The method of claim 1, wherein:
   the entry includes a selectable element; and
   the user input comprises a selection of the selectable element.

7. The method of claim 1, further comprising:
   causing, by the processor, an option to adjust a user account setting based on at least one of the first behavioral information and the second behavioral information to be displayed by the interactive user interface;
   receiving, at the processor, a user command in response to the option; and
   adjusting, by the processor, the user account setting based on the user command.

8. A device comprising:
   a processor; and a non-transitory memory in communication with the processor, the memory storing instructions that, when executed by the processor, cause the processor to perform processing comprising:
   processing a first plurality of transactions by a user;
   analyzing the first plurality of transactions to generate first behavioral information describing the user, the first behavioral information having a first type selected from among a plurality of types of behavioral information;
   sending the first behavioral information to a user device for display by an interactive user interface of the user device in an entry within a feed of information displayed by the interactive user interface;
   receiving, from the user device, a user input made in response to the first behavioral information being displayed through the interactive user interface, the user input including a selection of the entry;
   analyzing the user input to generate user preference information indicating a preference for at least a portion of the first behavioral information;
   processing a second plurality of transactions by the user;
   generating second data indicative of a second plurality of transactions by the user;
   identifying second behavioral information describing the user within the second data, the second behavioral information having the first type;
   sending the second behavioral information to the user device for display by the interactive user interface;
   wherein the feed is accessible from a home screen of the interactive user interface and separate from the home screen;
   the second behavioral information is displayed by the interactive user interface in the home screen;
   the home screen includes a settings interface; and the user input is made through the settings interface.

9. The device of claim 8, wherein:
   analyzing the first plurality of transactions comprises:
      identifying a plurality of peer users having at least one characteristic in common with the user;
      receiving peer data indicative of a plurality of transactions by the peer users; and
      generating peer behavioral information describing the peer users; and
   the instructions further cause the processor to perform processing comprising sending the peer behavioral information to the user device to be displayed by the interactive user interface.

10. The device of claim 9, wherein the instructions further cause the processor to perform processing comprising preventing information identifying the peer users from being included in the peer behavioral information displayed by the interactive user interface.

11. The device of claim 8, wherein:
analyzing the first plurality of transactions comprises using at least one script to generate at least one card for display by the interactive user interface.

12. The device of claim 11, wherein the instructions further cause the processor to perform processing comprising generating the at least one script.

13. The device of claim 8, wherein:
the entry includes a selectable element; and
the user input comprises a selection of the selectable element.

14. The device of claim 8, wherein the instructions further cause the processor to perform processing comprising:
sending data to the user device causing an option to adjust a user account setting based on at least one of the first behavioral information and the second behavioral information to be displayed by the interactive user interface;
receiving a user command from the user device in response to the option; and
adjusting the user account setting based on the user command.

15. A device comprising:
a display; an input device; a processor in communication with the display and the input device; and a non-transitory memory in communication with the processor, the memory storing instructions that, when executed by the processor, cause the processor to perform processing comprising:
receiving first data indicative of a first plurality of transactions by a user;
processing the first data to generate first behavioral information describing the user, the first behavioral information having a first type selected from among a plurality of types of behavioral information;
causing the first behavioral information to be displayed by an interactive user interface of the display in an entry within a feed of information displayed by the interactive user interface;
receiving a user input made in response to the first behavioral information being displayed through the interactive user interface, the user input including a selection of the entry;
receiving second data indicative of a second plurality of transactions by the user;
identifying second behavioral information describing the user within the second data, the second behavioral information having the first type;
causing, as a result of the identifying, the second behavioral information to be displayed by the interactive user interface;
the feed is accessible from a home screen of the interactive user interface and separate from the home screen;
the second behavioral information is displayed by the interactive user interface in the home screen;
the home screen includes a settings interface; and the user input is made through the settings interface.

16. The device of claim 15, wherein:
the entry includes a selectable element; and
the user input comprises a selection of the selectable element.

17. The device of claim 15, wherein the instructions further cause the processor to perform processing comprising:
displaying an option to adjust a user account setting based on at least one of the first behavioral information and the second behavioral information on the display;
receiving a user command through the input device in response to the option; and
sending the user command to the financial account server device.

* * * * *